United States Patent
Roberts et al.

(10) Patent No.: US 7,162,536 B1
(45) Date of Patent: Jan. 9, 2007

(54) VALIDATION OF A CONNECTION BETWEEN ARBITRARY END-NODES IN A COMMUNICATIONS NETWORK

(75) Inventors: Kim B. Roberts, Nepean (CA); Ronald J. Gagnon, Nepean (CA); Malcolm Betts, Kanata (CA)

(73) Assignee: Nortel Networks Limited, St. Laurent (CA)

( * ) Notice: Subject to any disclaimer, the term of this patent is extended or adjusted under 35 U.S.C. 154(b) by 1262 days.

(21) Appl. No.: 09/597,974

(22) Filed: Jun. 20, 2000

(51) Int. Cl.
*H04L 9/00* (2006.01)

(52) U.S. Cl. ..................... 709/237; 709/236

(58) Field of Classification Search ............... 713/201; 398/6, 1, 37, 181, 11, 18; 714/4, 6; 709/200, 709/218, 237, 224, 206, 207, 236, 238; 370/226
See application file for complete search history.

(56) References Cited

U.S. PATENT DOCUMENTS

| | | | |
|---|---|---|---|
| 5,784,377 A * | 7/1998 | Baydar et al. ............... | 370/463 |
| 5,838,919 A | 11/1998 | Schwaller et al. ..... | 395/200.54 |
| 5,920,705 A * | 7/1999 | Lyon et al. ................. | 709/240 |
| 6,182,226 B1 * | 1/2001 | Reid et al. .................. | 713/201 |
| 6,222,848 B1 * | 4/2001 | Hayward et al. ........... | 370/412 |
| 6,317,439 B1 * | 11/2001 | Cardona et al. ............ | 370/503 |
| 6,611,871 B1 * | 8/2003 | Kada et al. ................. | 709/238 |

OTHER PUBLICATIONS

Tektronix, Inc. "SONET Telecommunications", 1997.*
Samsung Electronics, "ECC algorithm", Aug. 30, 1997.*
"Introduction to Error Detection and Correction", Sep. 23, 1998.*

* cited by examiner

Primary Examiner—Gilberto Barrón, Jr.
Assistant Examiner—Thomas Ho
(74) Attorney, Agent, or Firm—Kent Daniels; Ogilvy Renault LLP

(57) ABSTRACT

An OP-N connection is mapped through a communications network between first and second end-nodes via at least one intermediate node. The integrity and validity of the OP-N connection can be determined independently of SONET/SDH lines, sections or paths mapped through the network, and potentially utilizing bandwidth of the OP-N connection. Validation of the OP-N connection can be accomplished by inserting performance monitor (PM) information into a data signal at the first end-node. In some embodiments, the PM information is inserted into an unused portion of the transport overhead (TOH) of a SONET/SDH data signal. At each intermediate node between the first and second end-nodes, the PM information is extracted from the data signal, buffered while the data signal is pointer processed, and the reinserted before forwarding the data signal. Finally, a the second end-point, the PM information is extracted and examined. Multiple levels of OP-N connections are supported, with each level being provided with a respective set of PM information.

59 Claims, 5 Drawing Sheets

VALIDATION OF A CONNECTION BETWEEN ARBITRARY END-NODES IN A COMMUNICATIONS NETWORK

CROSS-REFERENCE TO RELATED APPLICATIONS

This is the first application filed for the present invention.

MICROFICHE APPENDIX

Not Applicable.

TECHNICAL FIELD

This invention relates to communications networks, and in particular to a method for validating connections established between arbitrary end-points in a communications network.

BACKGROUND OF THE INVENTION

Within the modern network space, the Synchronous Optical Network (SONET)/Synchronous Digital Hierarchy (SDH) protocol is becoming increasingly popular as a mechanism for data transport. In this respect, SDH is the European equivalent of the SONET transmission standard. Accordingly, all references in this application to SONET should be understood to also refer to SDH.

Under the SONET/SDH architecture, connections through the network core, and between end-user communications devices, are constructed using a layered model. Each layer (or level) uses connections established at lower levels to build connections spanning progressively larger portions of the network. Within the network core, Section and Line-level connections are established. Section-level connections (commonly referred to as sections) are set-up between topologically adjacent nodes (which may, for example, be cross-connects, regenerators or Add-Drop-Multiplexors) of the network, and correspond to individual hops of an end-to-end connection. Line-level connections (commonly referred to as lines) are set-up between nodes (such as cross-connects or Add-Drop-Multiplexors) capable of processing line overhead within data signals. Regenerators are usually capable of terminating only sections, whereas cross-connects and Add-Drop-Multiplexors will normally terminate both sections and lines. Lines typically span one or more sections.

An end-to-end connection between nodes at which a data signal is multiplexed and demultiplexed uses a path-level connection (usually referred to as a Path). A path commonly spans multiple lines, and may extend beyond the network core to terminate at suitable end-user communications equipment (such as concentrator access switches or service provider routers).

The SONET/SDH protocol provides conventional methods for validating sections, lines and paths. These include section trace, section parity, and line parity checks which implement integrity and validation within one section or one SONET/SDH line. Telecordia TR-253 describes a Path Trace implementation, which enables an end-to-end validation of a path. Path parity implements a path level integrity check. Tandem connection monitoring implements additional integrity checks within the path level. These path-level integrity checks utilize validation, parity and fault indication data that are inserted into Synchronous Payload Envelopes (SPEs) of signals being transported through the path, typically embedded within the path overhead (POH).

Co-assigned U.S. Pat. No. 6,735,170 which issued on May 11, 2004, and entitled METHOD AND SYSTEM FOR ESTABLISHING CONTENT-FLEXIBLE CONNECTIONS teaches a technique for establishing an open connection (OP-N), mapped across a communications network. The OP-N connection is "concatenatable", in that an end user can transport arbitrarily concatenated signal traffic through the OP-N connection. In principle, virtually any combination of concatenated and non-concatenated signals may be used, up to the bandwidth capacity of the OP-N connection. The traffic mixture (i.e., the mix of concatenated and non-concatenated traffic) within the OP-N connection can be selected by the end user to satisfy their requirements, and may be changed by the end user as those requirements change, without requiring re-configuration of the OP-N connection.

The OP-N connection described in the above-referenced co-pending patent application is constructed using a layered model, in a manner analogous to conventional SONET/SDH connections. The layers of an OP-N connection are designed to fit between the SONET/SDH Line and Path layers. In general, an OP-N connection is expected to span multiple lines, and yet be shorter than an end-to-end Path. An OP-N connection may carry multiple paths and will be set up and validated prior to the establishment of any paths through it. Accordingly, it is necessary to implement a technique for validating OP-N connections independently of any Path-level connections.

Thus there is a need for a method and apparatus for validating an OP-N connection mapped through a communications network between arbitrary end-points.

SUMMARY OF THE INVENTION

An object of the present invention is to provide a method and apparatus for ensuring the integrity and validity of a connection mapped through a communications network between arbitrary end-points.

Another object of the present invention is to provide a method and apparatus for ensuring the integrity and validity of a connection mapped through a communications network between arbitrary end-points, in which the connection is topologically longer than one SONET/SDH line or section, and shorter than a SONET/SDH path.

A further object of the present invention is to provide a method and apparatus for ensuring the integrity and validity of multiple layers of connections that are topologically longer than one SONET/SDH line or section, and shorter than a SONET/SDH path.

Accordingly, an aspect of the present invention provides a method of validating a connection mapped through a communications network between arbitrary first and second end-points via at least one intermediate node. The method comprises the steps of: at the first end-point, inserting a connection performance monitor (PM) overhead (OH) into a signal overhead of a data signal; at each intermediate node, buffering the connection PM OH while pointer processing at least a payload portion of the data signal; and at the second end-point, extracting and examining the connection PM OH from the signal overhead.

A further aspect of the present invention provides node of a communications network adapted to enable validation of a connection mapped between the node and an arbitrary end-point via at least one intermediate node. The node comprises: means for inserting a connection PM OH into an overhead portion of a data signal; and means for launching the data signal through the communications network toward the end-point.

Another aspect of the present invention provides a node of a communications network adapted to enable validation of a connection mapped through the node between arbitrary first and second end-points. The node comprises: means for extracting a connection PM OH from an overhead portion of a data signal received from the first end-point; means for buffering the connection PM OH while pointer processing at least a payload portion of the data signal; and means for reinserting the connection PM OH into the overhead portion of the data signal prior to launching the data signal through the communications network toward the second end-point.

A further aspect of the present invention provides a node of a communications network adapted to enable validation of a connection mapped between the node and an arbitrary end-point via at least one intermediate node. The node comprises: means for receiving a data signal from the end-point via the intermediate node; and means for extracting and examining a connection PM OH from an overhead portion of the received data signal.

Each node (including nodes at each of the end-points, as well as the intermediate nodes) may comprise any one of a router; a cross-connect; and an add-drop multiplexor.

The connection PM OH may be inserted into a predetermined location within a transport overhead (TOH) portion of the signal overhead.

The connection may be mapped on one of a plurality of layers of connections. In such cases, a respective connection PM OH concerning a connection on each layer is preferably inserted into a corresponding predetermined location of the TOH.

The connection PM OH may comprise one or more of a Trace field; a Parity field; and an indicator field.

The Trace field may contain a portion of a trace message including connectivity information concerning the connection. Successive portions of the trace message may be inserted into respective successive signals. In one embodiment, the trace message is repeated every 32 signals.

The parity field may contain a parity value calculated in respect of a previous data signal. The parity value may be an 8-bit, Bit interleaved parity (BIP-8) value. On some embodiments, the parity value is calculated for each data signal starting after an H2 byte of a transport overhead (TOH) portion of the signal, and covering all SPE bytes until the next H2 byte.

The indicator field may contain an error count accumulated in respect of the data signal. The error count may be a BIP-8.

The step of buffering the connection PM OH at each intermediate node may comprise the steps of: extracting the connection PM OH from the signal overhead portion of the data signal received at the intermediate node; and reinserting the connection PM OH into the predetermined location within the signal overhead prior to launching the data signal toward the second end-point.

The step of extracting the connection PM OH may comprise the step of extracting one or more of a trace field; a parity field; and an indicator field.

The step of extracting the parity field may further comprise a step of calculating a received parity value in respect of the received data signal.

The step of extracting an indicator field may further comprise a step of accumulating a received error count value in respect of the received data signal.

The step of extracting the indicator field may further comprise the steps of: monitoring the contents of the indicator field of each successive received data signal; and setting an Alarm Indicator Signal (AIS) state if the indicator field of each of a first predetermined number of successive data signals contains a first predetermined value. The AIS state may be removed if the indicator field of each of the first predetermined number of successive data signals contains a value other than the first predetermined value. The first predetermined number of successive data signals may be three, and the first predetermined value may be binary "1111".

The step of extracting the indicator field may further comprise the steps of: monitoring the contents of the indicator field of each successive received signal; and setting a Remote Defect Indicator (RDI) state if the indicator field of each of a second predetermined number of successive signals contains a second predetermined value. The predetermined number of successive data signals may be three, and the second predetermined value may be binary "1100".

The step of buffering the extracted connection PM OH may comprise double-buffering the extracted connection PM OH.

The step of re-inserting the connection PM OH into the predetermined location within the signal overhead comprises a step of re-inserting one or more of a trace field; a parity field; and an indicator field, without change. However, the value of the indicator field may be set to a third predetermined value if an AIS state is detected. The third predetermined value may be binary "1100".

The step of extracting the connection PM OH at the second end-point may comprise the step of extracting one or more of a trace field; a parity field; and an indicator field. The step of extracting the parity field may further comprise a step of calculating a received parity value in respect of the received data signal. The step of extracting the indicator field may further comprise a step of accumulating a received error count value in respect of the received data signal.

An advantage of the present invention is that the connection PM OH bypasses pointer processor state machines in any nodes intermediate the end-points of the connection. As a result, corruption of the connection OH by such pointer processor state machines is avoided, and reliable validation of the connection between the first and second end-points can be achieved.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION OF THE PREFERRED EMBODIMENT

The present invention provides a method and apparatus for ensuring the integrity and validity of multiple layers of open (OP-N) connections mapped through a communications network.

Figure 1:
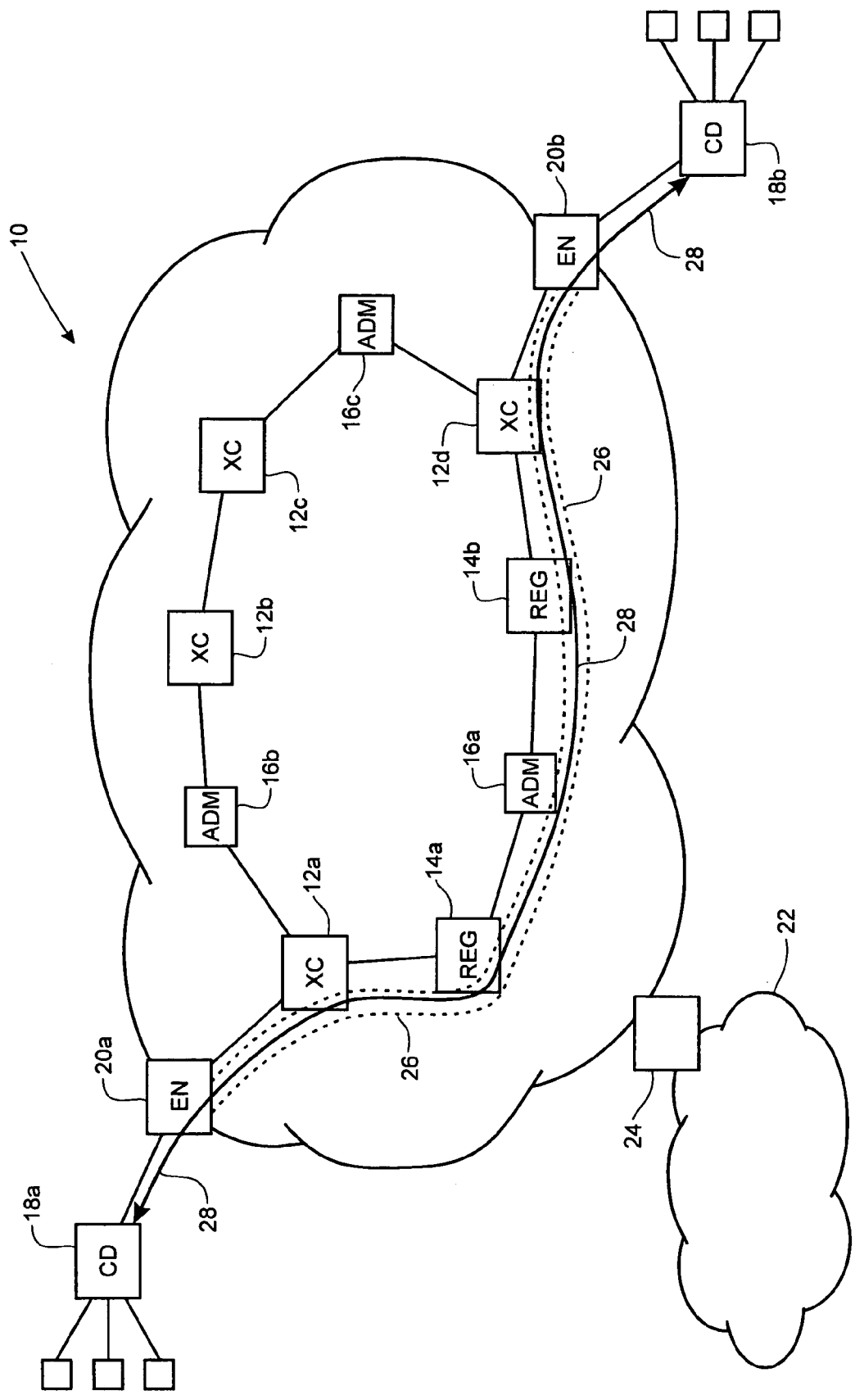
FIG. 1. is a block diagram schematically illustrating a communications network usable in conjunction with an embodiment of the present invention.

FIG. 1 is a schematic diagram of a communications network 10 in which the present invention may be utilized. The network 10 includes a plurality of nodes which may be, for example, cross-connects 12a–c, regenerators 14a–b or Add-Drop-multiplexors (ADMs) 16a–c. Communications devices 18a, 18b, for example, concentrator access switches or service provider routers, may be connected to the network 10 via one or more edge nodes 20a, 20b. The network 10 may also be connected to one or more associated networks 22, for example an asynchronous transfer mode (ATM) or an internet protocol (IP) network, through a respective gateway 24. Each of the cross-connects 12a–c, regenerators 14a–b, ADMs 16a–b, and edge nodes 20a–b are preferably optical nodes configured for wave division multiplex (WDM) and/or dense wave division multiplex (DWDM) transport of data traffic, as will be described below in greater detail.

As shown in FIG. 1, in order to support arbitrarily concatenated signal traffic between the end-user communications devices 18a and 18b, an OP-N connection 26 is mapped through the network 10 between the edge nodes 20a and 20b. The OP-N connection 26 is set up through "OP-N enabled" nodes, and is adapted to transport arbitrarily concatenated signal traffic up to the maximum bandwidth capacity of the OP-N. In the illustrated embodiment, the OP-N connection 26 is an OP-48 connection (i.e. N=48, see FIG. 2) so that the OP-N connection 26 has a bandwidth capacity equivalent to an optical carrier OC-48 signal. A SONET/SDH path 28 is mapped between end-user communications devices 18a and 18b through the OP-N connection 26, and utilizes some, or all, of the bandwidth capacity of the OP-N connection 26.

For the purposes of the present invention, an "OP-N enabled" node shall be understood to refer to a network node (of any type) having suitable hardware and software to enable it to participate in an OP-N connection, as described in applicant's above-referenced patent application. An OP-N enabled node is also capable of inserting and processing performance monitor (PM) information in a manner described below in greater detail.

Figure 2:
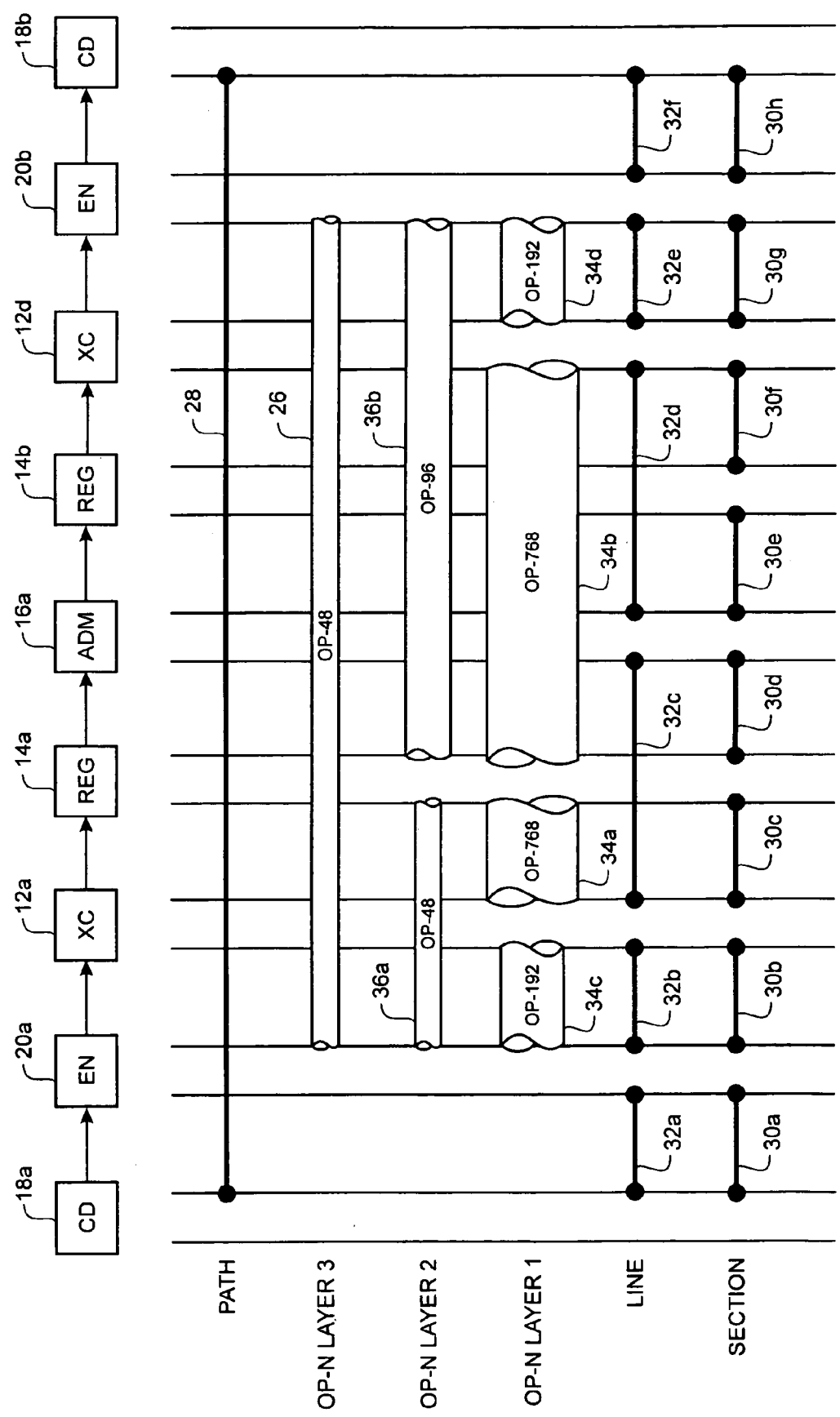
FIG. 2 is a schematic diagram illustrating an exemplary layered architecture of connections mapped through the communications network of FIG. 1.

FIG. 2 is a schematic diagram illustrating the construction of the OP-N connection 26 and the end-to-end SONET/SDH path 28. As shown in FIG. 2, both of these connections are constructed using a layered architecture. The SONET/SDH protocol defines section level connections 30a–h which correspond to individual hops in the path 28 between the communications devices 18a and 18b. Line connections 32a–f span one or more sections 30 between network nodes that are capable of processing SONET/SDH line overhead within data signals being transported through the path 28. Both section and line connections 30 and 32 are defined in the SONET/SDH standard. Similarly, the path 28 can be treated as a conventional SONET/SDH path connection because, from the point of view of the communications devices 18a and 18b, the path 28 is indistinguishable from a conventional SONET/SDH path. Thus conventional path level verification and integrity checks may be utilized. However, in the illustrated embodiment the path 28 is mapped through the OP-N connection 26. Accordingly, between the edge nodes 20a and 20b (defining respective opposite end-points of the OP-N connection 26), transport of data signals through the path 28 will be handled in accordance with the transport functions of the OP-N connection 26 rather than standard SONET/SDH.

As shown in FIG. 2, the OP-N connection 26 is constructed using a layered model. In the illustrated embodiment, this layered model employs three layers of OP-N connections, in which connections of each successive layer span successively larger distances through the network 10. It will be appreciated that the number of layers of connections is arbitrary, so that OP-N connections can be constructed through a network utilizing a layered model having more or fewer layers than illustrated in FIG. 2.

In the example shown in FIG. 2, high bandwidth layer 1 OP-N connections spanning comparatively short distances are mapped between selected nodes within the network. These layer 1 OP-N connections include a first OP-768 34a mapped between cross-connect 12a and regenerator 14a; a second OP-768 connection 34b mapped between regenerator 14a and cross-connects 12d; and a pair of feeder OP-192 connections 34c and 34d respectively linking edge nodes 20a and 20b to cross-connects 12a and 12d.

The layer 2 OP-N connections include an OP-48 connection 36a mapped between the edge node 20a and regenerator 14a, and utilizing a portion of the bandwidth of the layer 1 OP-768 and OP-192 connections 34a and 34c; and an OP-96 connection 36b mapped between the edge node 20b and the regenerator 14a that utilizes a portion of the bandwidth of each of the layer 1 OP-768 and OP-192 connections 34b and 34d. Finally, the OP-N connection 26 is a layer 3 OP-48 connection mapped between the edge nodes 20a and 20b. This connection occupies the entire bandwidth of the layer 2 OP-48 connection 36a, and a portion of the bandwidth of the layer 2 OP-96 connection 36b. In order to ensure reliable data communications using the SONET/SDH path 28 mapped through the OP-N connection 26, the present invention provides a method for validating each of the OP-N connections on each respective layer, independently of one another.

In accordance with the present invention, validation of OP-N connections in each layer is accomplished by inserting performance monitor (PM) information 38 into a predetermined location within each frame of a data signal. In principle, the PM information 38 can be inserted into any arbitrary location within a frame of a data signal. However, it is preferable to utilize an unused portion of transport overhead (TOH), as the remaining portion of the frame (e.g. the synchronous payload envelope-SPE) is fully defined, and therefore it is generally not possible to assume that any unused space will be available for carrying PM information 38. On the other hand, for high bandwidth concatenated signals, a significant amount of TOH is normally available for use for carrying PM information 38. For example, in the case of an OC-48c signal, the transport overhead of only the first STS-1 frame is required for routing the signal through the end-to-end path 28. Within each of the second through $48^{th}$ STS-1 frames of the OC-48c signal, a concatenation indicator is inserted into the TOH to indicate that the respective frame is to be treated in an identical manner to that of the previous STS-1 frame. As a result, much of the TOH within each of the second through $48^{th}$ frames of an OC-48c signal is redundant, and may therefore be utilized for carrying PM information 38, at least while the signal is being conveyed through an OP-N connection.

A difficulty associated with inserting PM information 38 into an unused portion of TOH is that the TOH is terminated at each line termination. Thus in the illustrated embodiment, the TOH would be terminated (and the continuity of the PM information 38 contained within it lost) at each of cross-connects 12a and d, and at add-drop-multiplexor 16a. The present invention avoids this difficulty by extracting, buffering and reinserting the PM information 38 at each node to by-pass conventional pointer-processing of the frame, as will be described in greater detail below.

Figure 3:
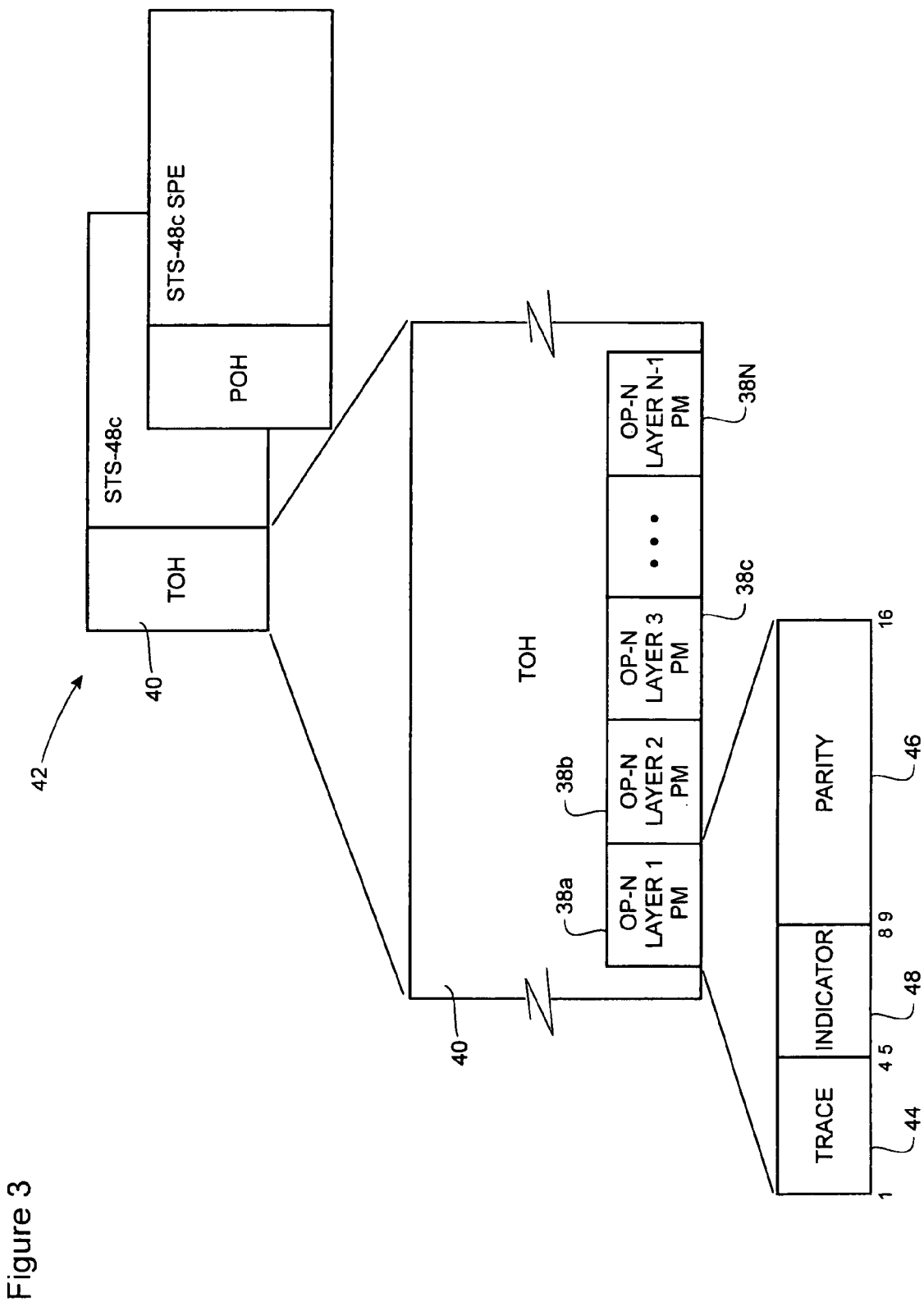
FIG. 3 is a schematic illustration of an exemplary format of connection performance monitor (PM) overhead for each layer of OP-N connections illustrated in FIG. 2.

As shown in FIG. 3, the PM information 38a–c associated with each OP-N connection layer is inserted into a respective predetermined location within the TOH 40 of each frame 42. Thus for a three-layer OP-N architecture, as illustrated in FIG. 2, three blocks of PM information 38a–c are inserted into respective locations within the TOH 40 of each frame 42. Each block of PM information 38 is preferably divided into predetermined fields to facilitate various connection integrity and validation checks. Exemplary fields include an OP-N trace 44, OP-N parity 46 and OP-N indicator 48. The use of each of these fields in validation and integrity checks of each OP-N connection is described below in greater detail, with particular reference to FIG. 4.

The example of FIG. 3 illustrates the insertion of PM information 38a–c within the TOH 40 of a conventional SONET/SDH STS-48c frame 42. However, it will be appreciated that the present invention is not limited to conventional SONET/SDH frames, but rather may be utilized in conjunction with any synchronous container capable of carrying a SONET/SDH SPE and traversing a SONET/SDH network fabric. Thus the frame 42 may be a modified SONET/SDH frame, or may be any proprietary frame capable of carrying a conventional SONET/SDH SPE across a SONET/SDH network.

Figure 4:
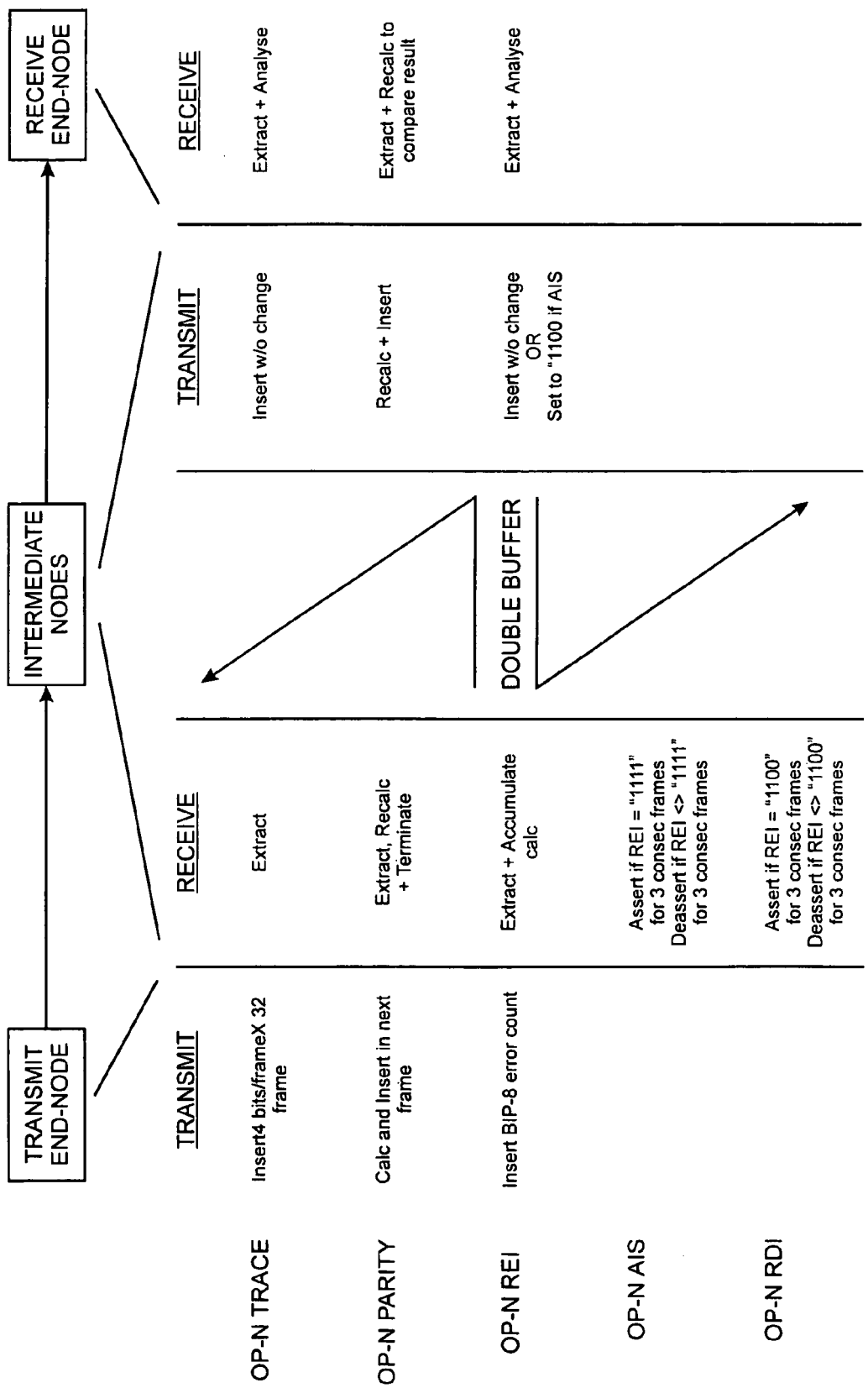
FIG. 4 is a schematic illustration of exemplary operations in a method of validating OP-N connections in accordance with an embodiment of the present invention.

In use, PM information 38 is inserted into a frame 42 by a node serving as a transmitting end-point of an OP-N connection, and then extracted from the frame 42 and examined by a node serving as a receiving end-point of the OP-N connection (see FIG. 4). At nodes intermediate the end-points of an OP-N connection, the PM information 38 is extracted and buffered while the frame SPE is pointer processed through the node, and then re-inserted into the frame for transmission through the next section of the OP-N connection. As mentioned above, this process is required because the TOH is terminated at the end of each line 32. If desired, the extracted PM information 38 can be double-buffered. This permits "slips" (i.e. duplication or dropping of all PM information for one frame) to be used for rate adaptation, as in general the line clock and the system clock are not frequency locked.

For example, in the case of a signal being transported through the path 28 between the communications devices 18a and 18b, layer 1, 2 and 3 PM information 38a, b, c (FIG. 3) in respect of the OP-192 connection 34c, OP-48 36a and OP-48 26, respectively, is prepared and inserted into the TOH of each frame by the edge node 20a. At the cross-connect 12a, the layer 1 PM information 38a is extracted from the signal and examined, while the layer 2 and layer 3 PM information 38b and 38c is extracted and buffered. A new layer 1 PM information 38a in respect of the OP-768 connection 34a is then inserted into the TOH by the cross-connect 12a and the buffered layer 2 and layer 3 PM information 38b and 38c is reinserted prior to transmitting the signal through the OP-768 connection 34a to the regenerator 14a. At regenerator 14a, layer 1 and layer 2 PM information 38a,b is extracted and examined, while the layer 3 PM information 38c is extracted and buffered. The regenerator 14a then prepares and inserts new layer 1 and layer 2 PM information 38a,b respecting the OP-768 connection 34b and the OP-96 36b, and reinsertes the layer 3 PM information 38c, prior to transmitting the frame. The OP-768 connection 34b includes two intermediate nodes (add-drop multiplexor 16a, and regenerator 14b). The OP-96 connection 36b includes three intermediate nodes (add-Drop multiplexer 16a, regenerator 14b and cross-connect 12d). At each of the intermediate nodes 16a and 14b the layer 1, layer 2 and layer 3 PM information 38a–c is extracted and buffered while the signal SPE is pointer processed through the node. The PM information 38a–c is re-inserted into the frame for transmission through the next section of the OP-768 connection 34b. When the signal arrives at the cross-connect 12d, the layer 1 PM information 38a respecting the OP-768 connection 34b (FIG. 2) is extracted from the signal and examined while the layer 2 and layer 3 PM information 38b and 38c is extracted and buffered as explained above. New layer 1 PM information 38a respecting the feeder OP-192 connection 34d is prepared within the cross-connect 12d and inserted into the signal, and the layer 2 and layer 3 PM information 38b and 38c reinserted, prior to launching the signal toward the edge node 20b, which extracts and examines the PM information 38a, 38b and 38c to validate each of layer 1 OP-192 connection 34d, layer 2 OP-96 connection 36b, and layer 3 OP-48 connection 26.

As described above, at a node serving as a transmitter end-node of an OP-N connection (e.g. edge node 20a in the example of FIG. 2), PM information 38 (including, for example, OP-N trace, parity and indicator information) respecting the OP-N connection are prepared and inserted into the transport overhead of each frame. At a node serving as a receiver end-node of the OP-N connection (e.g. edge node 20b in the example of FIG. 2), the respective PM information is extracted from the signal and examined to determine the validity and integrity of the OP-N connection. At any pointer processing nodes intermediate the transmit and receive end-nodes of the OP-N connection, the PM information 38 is extracted from the transport overhead and buffered while at least the payload portion of the signal is pointer processed through the node, and then re-inserted into the frame prior to transmission of the data signal. As shown in FIG. 4, at each intermediate pointer processing node, the OP-N trace field 44 extracted from received signals is re-inserted without change. Under normal circumstances, the indicator field 48 (FIG. 3) will also be extracted and re-inserted without change. However, if a fault in the OP-N connection is detected at any intermediate node, then the content of the indicator field 48 may be changed to reflect the detected fault, as will be described below in greater detail. The OP-N parity field 46 is terminated, and a recalculated parity inserted into outgoing frames.

The purpose and function of each of the OP-N trace, parity, and indicator fields 44–48 of the PM information 38 is explained below with reference to FIG. 4. As will be understood by those skilled in the art, an OP-N connection is normally enabled in both directions between the end nodes. However, for the sake of simplicity, transmission in only one direction is illustrated.

OP-N Trace

The OP-N trace field 44 of the PM information 38 carries a trace message (having a length of, for example, 16 bytes) carrying connectivity information for a respective OP-N connection. The trace message is preferably divided into smaller parts (nibbles having a length of, for example, 4 bits), with successive nibbles being included in the PM information 38 inserted into successive frames of a data signal. If a 16-byte trace message is divided into 4 bit nibbles, the trace message repeats every 32 frames. The format of the trace message can be arbitrary. It is normally defined by a software application that is used to implement the OP-N PM information messaging functionality.

At the transmit end-node of an OP-N connection, a trace message in respect of the OP-N connection is prepared for insertion into outgoing frames. At the receive end-node of the OP-N connection, the trace message is extracted from received frames and examined to verify the connectivity of the OP-N connection. At any nodes intermediate the two end-points of the OP-N connection, the trace message is passed through the node (that is, extracted, buffered, and reinserted) without change. If the trace message is sent in 4 bit nibbles, each nibble is stored in local memory in the receiver node until the entire 16 byte message has been reassembled.

OP-N Parity

The OP-N parity field 46 of the PM information 38 provides a parity check between transmit and receive nodes in an OP-N connection. For example, the hardware within each node can process and report OP-N parity on a per-frame or per-signal (e.g. STS-48) basis. If desired, OP-N parity may be used to generate Errored and Severely Errored seconds counts rather than being used to infer precise bit error ratios.

OP-N parity can advantageously be calculated as an 8-bit, Bit Interleaved Parity (BIP-8) value using even parity (so that the parity will be correct during AIS insertion, described below), over a predetermined portion of a data signal. For example, a BIP-8 value can be calculated starting after the H2 byte of TOH covering all STS-N SPE bytes until the next H2 byte. Positive and negative stuff (H3) bytes, as well as the corresponding OP-N trace and OP-N indicator fields 44 and 48, may also be included. The BIP-8 result calculated for an outgoing frame can be inserted into the OP-N parity field 46 of the next frame.

At each node in an OP-N connection, OP-N parity can be recalculated and accumulated (bit or block) as each frame is received.

At a transmit end-node of an OP-N connection, OP-N parity is calculated for outgoing frames (and inserted into the parity field 46 of the next outgoing frame). At the receiver end-node of the OP-N connection, the OP-N parity information is extracted and simultaneously recalculated as successive frames are received. These extracted and recalculated values can then be compared to assess the integrity of the OP-N connection.

The OP-N parity is terminated at each intermediate node within the OP-N connection. As each frame is received, the OP-N parity is recalculated and a parity error value calculated by comparing the recalculated parity value with the received parity value extracted from the parity field 46. The comparison result (i.e. the parity error value) is XOR'd with the received parity value and the result buffered, which has the effect of terminating the parity. As each frame is transmitted from the node, a valid parity value is recalculated for the outgoing frame; XOR'd with the value saved in the buffer; and inserted into the next outgoing frame. This results in a valid parity value being inserted into the parity field 46 of each outgoing frame.

OP-N Indicator Field

This field 48 of the PM information 38 enables fault information to be conveyed to the end-nodes of the OP-N connection. Various fault indications may be provided in respect of each OP-N connection. Exemplary fault indications include Remote Error Indication (REI), Alarm Indication Signaling (AIS), and Remote Defect Indication (RDI). Each of these are described in greater detail below.

OP-N Remote Error Indication (REI)

OP-N Remote Error Indication (REI) provides a capability to signal bit errors to the far-end on a frame-by-frame basis.

In the receive direction, each node accumulates a valid OP-N error count (e.g. a BIP-8 error count based on received and recalculated parity values, as described above) as successive frames are received. At a node serving as a transmit end-node of an OP-N connection, the node hardware can insert the OP-N error count accumulated as the frames were received. At the receive end-node of the OP-N connection, the error count is accumulated as successive frames are received. The error count information is passed through the intermediate nodes (that is, extracted, buffered, and reinserted) without change.

OP-N Alarm Indication Signaling (AIS)

OP-N Alarm Indication Signaling (AIS) is used to signal a failure downstream of the receive end-node of the OP-N connection. When either Line or Path AIS is asserted (in accordance with conventional SONET/SDH protocol) at any node participating in an OP-N connection, the payload as well as the Transparent Container is set to all 1's.

At each node in the OP-N connection, OP-N AIS is asserted if the OP-N REI error count information contains "1111" for 3 consecutively received frames. OP-N AIS is de-asserted if a value, other than "1111", remains unchanged for 3 consecutive frames. When OP-N AIS is asserted (or when otherwise enabled by software), a value of "1100" is inserted into the OP-N indicator field 48 of the PM information of each outgoing frame.

OP-N Remote Defect Indication (RDI)

OP-N Remote Defect Indication (RDI) is used to signal conditions such as OP-N-AIS and Trace mismatch to the far-end of the OP-N. OP-N RDI uses the same set of bits that is used for OP-N REI information.

At each node in the OP-N connection, OP-N RDI is asserted if the OP-N REI information contains "1100" for 3 consecutively received frames. OP-N RDI is de-asserted if a value, other than "1100", is received unchanged for 3 consecutive frames.

Figure 5:
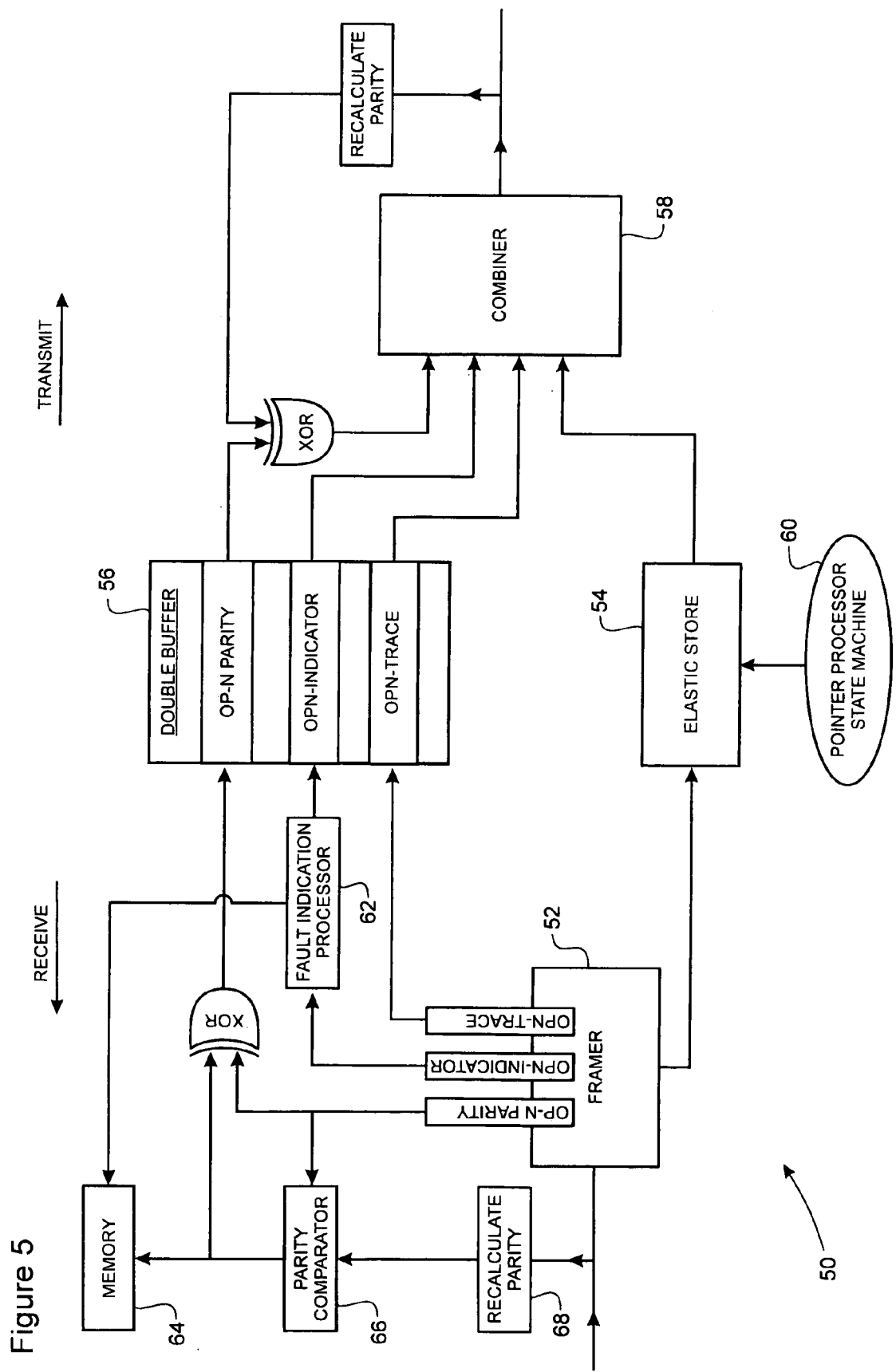
FIG. 5 is a block diagram illustrating an apparatus for processing performance monitoring (PM) information through a node, in accordance with an embodiment of the present invention.

FIG. 5 is a block diagram illustrating an exemplary implementation of an OP-N processor 50 for processing frames including PM information 38 in accordance with the present invention. The OP-N processor 50 is implemented (by hardware and software) within each OP-N enabled node of the network 10, and generally comprises a framer 52; an elastic store 54; a double buffer 56; a combiner 58; and a pointer-processor state machine 60. The framer 52 operates to receive successive frames of an incoming signal, and extracts the PM information and the frame payload (e.g. the synchronous payload envelope-SPE). The SPE is forwarded to the elastic store 54, which may be implemented as a first-in-first-out (FIFO) having an adjustable read pointer (not shown). Processing of the SPE through the elastic store 54 (and through the node), is controlled by the pointer processor state machine 60 in a conventional manner, and therefore will not be described in greater detail herein.

The PM information extracted from the incoming frame is processed as described above with reference to FIG. 4. Thus the contents of the OP-N trace field 44 is saved in the double buffer 56. The contents of the OP-N indicator field 48 is processed by a fault indication processor 62 (i.e. for OP-N REI, OP-N AIS and OP-N RDI) and saved in the double buffer 56. An accumulated BIP-80P-N REI error count can also be saved in a memory 64. The contents of the OP-N parity field 46 is supplied to an input of a parity comparator 66 as a received parity value. A recalculated parity value, which is determined by a parity calculation circuit 68 on the basis of received frames of the incoming signal, is supplied to another input of the parity comparator 66. The parity comparator 66 operates to compare the received and recalculated parity values, and saves the comparison result in the memory 64 as an accumulated parity error value. The comparison result is XOR'd with the received parity value and saved in the double buffer 56. This operation has the effect of terminating the parity and determining the amount of errors of incoming frames.

The processing of received frames described above can be implemented in both intermediate nodes and in a receiving end-node of an OP-N connection. In the case of intermediate nodes, this "receiver side" processing results in appropriate values of the OP-N trace 44, OP-N parity 46 and OP-N indicator 48 fields being stored in the double buffer 56. In the case of the receiving end-node, this processing results in the accumulation of parity and REI error values in the memory 64 to permit evaluation of the integrity and validity of the OP-N connection.

On a transmit side of the OP-N processor 50, the PM information is read from the double buffer 56 and inserted into successive frames of an outgoing signal by the combiner 58. If the line clock of the outgoing signal is out of frequency-lock with the system clock (of the node), then slips (e.g. duplication or omission of the buffered PM information) can be used as required to compensate for the frequency difference. In order to insert the PM information into an outgoing frame, the applicable values of the OP-N trace field 44 and OP-N Indicator field 48 are read from the double buffer, and inserted into the outgoing frame. For the OP-N parity field 46, the OP-N parity value read into the double buffer is XOR'd with an outgoing parity value calculated in respect of a previous outgoing frame, and the result is inserted into the outgoing frame. In intermediate nodes (i.e. in which incoming frames include a valid OP-N parity value), this operation results in the received parity value being inserted into the corresponding outgoing frame without change, as described above with reference to FIG. 4. In the case of a transmitting end-node of an OP-N connection, this operation results in the calculation of a parity value for each outgoing frame, with the calculated value being inserted in the next outgoing frame.

The present invention therefore provides a method and apparatus for validating OP-N connections mapped through a communications network.

The embodiment(s) of the invention described above is(are) intended to be exemplary only. The scope of the invention is therefore intended to be limited solely by the scope of the appended claims.

We claim:

1. A method of validating a connection mapped between first and second end-nodes via at least one intermediate node in a communications network, the method comprising the steps of:
   a) at the first end-node, inserting performance monitor (PM) information into a predetermined location within a data signal conveyed through the connection, wherein the PM information bypasses pointer processor state machines in any nodes intermediate the end-points of the connection;
   b) at the at least one intermediate node:
      i) extracting the PM information from the predetermined location within the signal received at the intermediate node;
      ii) buffering the extracted PM information; and
      iii) reinserting the buffered PM information into the predetermined location within the signal prior to transmitting the data signal toward the second end-node; and
   c) at the second end-node, extracting the PM information from the data signal.

2. A method as claimed in claim 1, wherein the data signal contains a SONET/SDH SPE and the step of inserting the PM information comprises a step of inserting the PM information into a predetermined location within a transport overhead (TOH) outside of the SPE.

3. A method as claimed in claim 2, wherein each node in the network is adapted to support a plurality of connection layers and the connection is mapped on one of the plurality of connection layers.

4. A method as claimed in claim 3, wherein PM information respecting each layer is inserted into a respective predetermined location of the TOH.

5. A method as claimed in claim 1, wherein the step of inserting PM information comprises a step of inserting one or more of a Trace field; a Parity field; and an indicator field.

6. A method as claimed in claim 5, wherein the step of inserting a Trace field comprises inserting a nibble of a trace message for communicating information concerning the connection.

7. A method as claimed in claim 6, wherein the step of inserting the nibble of a trace message comprises a step of inserting successive nibbles of the trace message into respective successive signals until an entire trace message has been sent.

8. A method as claimed in claim 6, wherein the step of inserting a Trace field comprises repeating the trace message after the entire trace message has been sent.

9. A method as claimed in claim 5, wherein the step of inserting a parity field comprises a step of calculating a parity value in respect of a data signal, and inserting the parity value into a next data signal to be transmitted.

10. A method as claimed in claim 9, wherein the data signal contains a SONET/SDH SPE and the parity value is a BIP-8.

11. A method as claimed in claim 10, wherein the parity value is calculated starting after an H2 byte of a transport overhead (TOH) portion of the signal, and incorporates all SPE bytes until the H2 byte of a next data signal.

12. A method as claimed in claim 5, wherein the step of inserting an indicator field comprises a step of accumulating an error count in respect of the data signal.

13. A method as claimed in claim 12, wherein the data signal is a SONET/SDH signal and the error count is a BIP-8.

14. A method as claimed in claim 1, wherein the step of extracting the PM information comprises a step of extracting one or more of a trace field; a parity field; and an indicator field.

15. A method as claimed in claim 14, wherein the step of extracting a parity field further comprises a step of calculating a parity value in respect of the received data signal.

16. A method as claimed in claim 15, further comprising the steps of:
   a) comparing the recalculated parity value with a received parity value contained in the extracted parity field to obtain an error count; and
   b) XORing the error count with the received parity value.

17. A method as claimed in claim 16, wherein the step of buffering the PM information comprises the step of buffering the XOR result as a buffered parity value.

18. A method as claimed in claim 16, further comprising a step of accumulating the error count value in respect of the received data signal.

19. A method as claimed in claim 14, wherein the step of extracting an indicator field further comprises the steps of:
   a) monitoring the indicator field of each successive received data signal; and
   b) asserting an AIS state if the indicator field of each of a first predetermined number of successive data signals contains a first predetermined value.

20. A method as claimed in claim 19, further comprising a step of de-asserting the AIS state if the indicator field of each of the first predetermined number of successive data signals contains a value other than the first predetermined value.

21. A method as claimed in claim 19, wherein the first predetermined number of successive data signals is three.

22. A method as claimed in claim 19, wherein the first predetermined value is binary "1111".

23. A method as claimed in claim 14, wherein the step of extracting an indicator field further comprises the steps of:
   a) monitoring the indicator field of each successive received signal; and
   b) asserting an RDI state if the indicator field of each of a second predetermined number of successive signals contains a second predetermined value.

24. A method as claimed in claim 23, wherein the predetermined number of successive data signals is three.

25. A method as claimed in claim 23, wherein the second predetermined value is binary "1100".

26. A method as claimed in claim 1, wherein the step of buffering the extracted PM information comprises double-buffering the extracted PM information.

27. A method as claimed in claim 1, wherein the step of reinserting the buffered PM information into the predetermined location within the signal overhead comprises a step of inserting one or more of a buffered trace field; a buffered parity field; and a buffered indicator field.

28. A method as claimed in claim 27, wherein the buffered trace field in inserted into the data signal without change.

29. A method as claimed in claim 27, wherein the step of inserting the buffered parity field comprises the steps of:
   a) calculating a parity value of an outgoing signal;
   b) XORing the calculated parity value with the contents of the buffered parity field; and
   c) inserting the XOR result into a successive outgoing signal.

30. A method as claimed in claim 27, wherein the step of inserting the buffered indicator field comprises a step of setting contents of the indicator field to a third predetermined value if an AIS state is has been asserted.

31. A method as claimed in claim 30, wherein the third predetermined value is binary "1100".

32. A method as claimed in claim 1, wherein the step of extracting the PM information at the second end-node comprises the step of extracting one or more of a trace field; a parity field, and an indicator field.

33. A method as claimed in claim 32, wherein the step of extracting the parity field further comprises a step of calculating a parity value in respect of the received data signal.

34. A method as claimed in claim 32, wherein the step of extracting an indicator field further comprises a step of accumulating an error count value in respect of the received data signal.

35. An apparatus for validating a connection mapped between first and second end-nodes via at least one intermediate node in a communications network, the apparatus comprising:
   a framer for extracting performance monitoring (PM) information from a data signal being
      conveyed through the connection, wherein the PM information bypasses pointer processor state machines in any nodes intermediate the end-points of the connection;
   means for buffering the extracted PM information while the data signal is pointer processed; and
   means for inserting the buffered PM information into the data signal prior to forwarding the data signal.

36. An apparatus as claimed in claim 35, wherein the data signal contains a SONET/SDH SPE and the PM information in inserted into a predetermined location within a transport overhead (TOH) outside the SPE.

37. An apparatus as claimed in claim 36, wherein each node in the network is adapted to support a plurality of connection layers and the connection is mapped on one of the plurality of connection layers.

38. An apparatus as claimed in claim 37, wherein PM information respecting each layer is inserted into a respective predetermined location in the TOH.

39. An apparatus as claimed in claim 35, wherein the PM information comprises one or more of a Trace field; a Parity field; and an indicator field.

40. An apparatus as claimed in claim 39, wherein the trace field comprises a nibble of a trace message for communicating information concerning the OP-N connection.

41. An apparatus as claimed in claim 40, wherein successive nibbles of the trace message are inserted into respective successive signals until an entire trace message has been sent.

42. An apparatus as claimed in claim 40, wherein the trace message is repeated after the entire trace message has been sent.

43. An apparatus as claimed in claim 39, wherein the parity field contains a parity value calculated in respect of a previously forwarded data signal.

44. An apparatus as claimed in claim 43, wherein the data signal contains a SONET/SDH frame and the parity value is a BIP-8.

45. An apparatus as claimed in claim 44, wherein the parity value is calculated starting after an H2 byte of a transport overhead (TOH) portion of the signal, and incorporates all SPE bytes until the H2 byte of a next data signal.

46. An apparatus as claimed in claim 39, wherein the indicator field comprises an accumulated error count in respect of the data signal.

47. An apparatus as claimed in claim 46, wherein the data signal comprises a SONET/SDH SPE and the error count is a BIP-8.

48. An apparatus as claimed in claim 35, further comprising:
   a) means for calculating a parity value in respect of the received data signal;

b) means for comparing the calculated parity value with a received parity value extracted from the parity field of the received data signal to generate an error count;

c) an XOR logic gate adapted to XOR the error count and the received parity value; and d) means for saving the XOR result as the buffered parity value.

49. An apparatus as claimed in claim 48, further comprising a memory for accumulating the error count in respect of the received data signal.

50. An apparatus as claimed in claim 39, further comprising:

a) means for monitoring the indicator field of each successive received data signal; and b) means for asserting an AIS state if the indicator field of each of a first predetermined number of successive data signals contains a first predetermined value.

51. An apparatus as claimed in claim 50, further comprising means for de-asserting the AIS state if the indicator field of each of the first predetermined number of successive data signals contains a value other than the first predetermined value.

52. An apparatus as claimed in claim 50, wherein the first predetermined number of successive data signals is tree.

53. An apparatus as claimed in claim 50, wherein the first predetermined value is binary "1111".

54. An apparatus as claimed in claim 39, further comprising:

a) means for monitoring the indicator field of each successive received signal; and b) means for asserting an RDI state if the indicator field of each of a second predetermined number of successive signals contains a second predetermined value.

55. An apparatus as claimed in claim 54, wherein the predetermined number of successive data signals is three.

56. An apparatus as claimed in claim 54, wherein the second predetermined value is binary "1100".

57. An apparatus as claimed in claim 35, wherein the means for buffering the extracted PM information comprises a double-buffer.

58. An apparatus as claimed in claim 39, wherein the means for inserting the PM information comprises means for setting contents of the indicator field to a third predetermined value if an AIS state is has been asserted.

59. An apparatus as claimed in claim 58, wherein the third predetermined value is binary "1100".

* * * * *